United States Patent Office

Re. 28,276
Reissued Dec. 17, 1974

28,276

MILK FERMENTING PRODUCT AND METHOD OF MAKING SAME

Stewart M. Farr, Sarasota, Fla., assignor to Microlife Technics, Inc., Sarasota, Fla.

No Drawing. Original No. 3,420,742, dated Jan. 7, 1969, Ser. No. 404,526, Oct. 16, 1964, which is a continuation-in-part of abandoned application Ser. No. 285,858, June 6, 1963. Application for reissue Nov. 19, 1973, Ser. No. 417,134

Int. Cl. C12k *3/00*

U.S. Cl. 195—96 5 Claims

Matter enclosed in heavy brackets [ ] appears in the original patent but forms no part of this reissue specification; matter printed in italics indicates the additions made by reissue.

ABSTRACT OF THE DISCLOSURE

A method of producing a mixed bacterial concentrate which comprises separately incubating in separate culture media two or three types of bacteria, the first type being selected from the group consisting of Streptococcus lactis, Streptococcus cremoris, Lactobacillus bulgaricus and Streptococcus thermophilus, the second type being selected from the group consisting of Streptococcus citrovorus and Streptococcus paracitrovorus, and the third type consisting of Streptococcus diacetylactis, concentrating the respective media to obtain separate concentrates of the two or three types of bacteria, mixing together the two or three types of bacteria in the desired proportions to produce a mixed concentrate without permitting further growth of the bacteria, and then freezing the mixed concentrate so that it can be stored for a long time without major loss in the viability of the bacteria. A stabilized mixed bacteria concentrate consisting essentially of a substantially neutralized mixture of two or three types of bacteria, as aforesaid, the concentrate being stabilized by the admixture of a stabilizing agent and a nutrient medium and the concentrate being frozen so that it can be stored for a long period of time without major loss in the viability of the bacteria.

This application is a continuation-in-part of my copending application Ser. No. 285,858, filed June 6, 1963, now abandoned.

This invention relates to a concentrated bacterial product useful for fermenting milk in order to make cottage cheese, cheese, butter, cultured buttermilk and other cultured milk products, and also relates to a process for producing said bacterial product.

In the following description and claims, the term "acid-producing bacteria" shall refer to bacteria capable of fermenting lactose or other, similar carbohydrates rapidly at temperatures of about 70 degrees Fahrenheit to 110 degrees Fahrenheit with the production of principally lactic acid, namely, Streptococcus lactis, Streptococcus cremoris, Lactobacillus bulgaricus and Streptococcus thermophilus. The term "flavor-producing bacteria" shall refer to bacteria capable of fermenting citric acid or citrates at a favorable pH with the production of biacetyl, actylmethylcarbinol, volatile acids and carbon dioxide, namely, Leuconostoc citrovorum (Streptococcus citrovorus) and Leuconostoc dextranicum (Streptococcus paracitrovorus) and subspecies thereof. Streptococcus diacetylactis a species not recognized in Bergey's Manual. Breed, Murray and Hitchins, 1957) produces some lactic acid and also produces substantial amounts of flavor constituents.

Cottage cheese, cheese, butter and cultured buttermilk are manufactured by a fermenting procedure using a suitable bacteria. Dairies usually purchase an initial culture of a mixture of suitable bacteria from a commercial organization supplying same. This culture is then propagated in the dairy by placing the culture in milk and incubating it at a suitable temperature, usually at around 70 degrees Fahrenheit, for a suitable period of time, usually from 14 to 18 hours, in order to form a mother culture. The propagation step is repeated a number of times using the bacterial product of the preceding step as the inoculum and finally the propagation is carried out in a rather large quantity of milk in order either to produce a bulk starter, which can then be used for fermenting the final batch of milk to make the end product, or to produce cultured buttermilk.

If sufficient care is not taken both in the manufacture of the mother culture and in the propagation thereof, bacteriophage may become present in the bulk starter, or perhaps earlier in the propagation process, and may proliferate so as to hinder the growth of or completely destroy the bacteria. This may cause delayed setting or no setting of the milk. If this contamination occurs, large quantities of milk are often lost and all of the time and labor spent in propagating the culture are wasted. Contamination of the initial culture is not a serious problem because the initial culture is produced under carefully controlled conditions with special equipment and by skilled personnel. However, few dairies and the like, where most of the propagating is presently performed, are so equipped. Thus, the incidence of such contamination during the propagation of the bacteria according to present practices in dairies is believed to be higher than necessary.

The initial culture most usually acquired from a supplier consists of a mixture of at least two of the three types of bacteria referred to above, namely, acid-producing bacteria and flavor-producing bacteria and Streptococcus diacetylactis. The types of bacteria must be properly balanced in order to produce acceptable products and the proper bacterial balance for producing one product, such as cottage cheese, is different than the proper balance required for another product, such as cultured buttermilk. The types of bacteria do not grow equally well in a propagation process of the type described above because plain milk favors the growth of the acid-producing bacteria at the expense of the flavor-producing bacteria. Thus, even though the mother culture may have the proper balance of the types of bacteria, there may be a serious unbalance by the time the bulk starter has been made. Moreover, this unbalance may not be discovered until an unacceptable end product has been produced, which results in major economic losses.

It is possible to overcome these problems by suitable care and control over the propagating process, but to do so requires constant supervision by a skilled person having a sound knowledge of dairy bacteriology, and it also requires a considerable investiment in equipment.

Moreover, because of the time required to produce the bulk starter, dairies must anticipate their need for a cultured milk product several days in advance. Thus, they may be unable to supply an unexpected demand for a particular product on short notice. Also they may find that by the time the bulk starter is made the anticipated demand for the cultured milk product may not have materialized and the bulk starter may have to be thrown away, all of which involves considerable loss.

In addition, even under optimum conditions the present starter cultures are bulky and have a relatively short life. They must be used soon after they are made and they are not easy to store. For example, in making a slow set cottage cheese approximately eight (8) quarts of starter are required to inoculate one hundred (100) gallons of milk;

while in a fast set process, which is the one commonly used, approximately five times this amount or 40 quarts of inoculum are required. When it is realized that it is customary to inoculate at least 10 times this amount of milk or 1000 gallons at one time, it will be seen that the preparing, storage and handling of the inoculum becomes costly and, because of the necessity of maintaining bacteria viability, it is a difficult problem.

Accordingly, a need exists for a bacterial product for use by dairies which is free of bacteriophage and which contains acid-producing bacteria and flavor-producing bacteria or acid-producing bacteria, flavor-producing bacteria and Streptococcus diacetylactis in the proper balance, which is of such high potency or concentration that ample supplies are easy to store, and which is prepared in such a manner that it will remain viable in a stored condition for an extended period of time. This bacterial product can be placed directly into milk for forming the end product, without further propagation in the dairy, so that the cultured end product can be produced rapidly and inexpensively. The present invention is intended to meet the need for such a product.

Further, there are certain types of cultured dairy products, of which yoghurt is an example, for which the demand is low so that they either are not produced at all or they are produced in such small quantities that the cost to the consumer is quite high. If consumers could obtain a bacterial product which would permit them to make such products easily, conveniently and rapidly in the home from plain milk, the demand for this type of product would be more easily supplied and at a lower cost to the consumer. The present invention also is intended to meet this need.

The objects of the invention are met by providing a bacteriophage free, stabilized and concentrated bacterial product consisting of a mixture of acid-producing bacteria and flavor-producing bacteria of a mixture of acid-producing bacteria, flavor-producing bacteria and Streptococcus diacetylactis having a high total bacterial concentration, about five cubic centimeters of the concentrate containing approximately the same number of bacteria as are present in one quart of fully fermented milk or, in other words, a concentrate whose bacteria count is approximately 189 times the bacteria count in fully fermented milk. Otherwise stated, the bacterial concentrate has $10\text{–}60\times10^9$ cells per ml. The bacterial product contains by admixture at least about 2 percent by weight of glycerol plus a suitable nutrient medium and is quickly frozen whereby the viability of the bacteria is maintained at a high level for a long time period. The ratio of the acid-producing bacteria to the flavor-producing bacteria or the ratio of the acid-producing bacteria to the flavor-producing bacteria and the Streptococcus diacetylactis is carefully controlled and is adjusted as needed in order to adapt the bacterial product to the production of a particular type of cultured milk product. In general, the percentage of the flavor-producing bacteria concentrate plus the percentage of the Streptococcus diacetylactis concentrate ranges from about 2 to about 12 percent of the total count and the acid-producing bacteria concentrate constitutes the balance of the end product.

According to the method aspects of the invention, it is a critical feature of the invention that the acid-producing bacteria, the flavor-producing bacteria and the Streptococcus diacetylactis be grown and concentrated separately from each other. The three types of bacteria are separately grown or propagated in their respective culture media and then they are concentrated by centrifuging to produce separate concentrated bacterial products. About five cubic centimeters of each concentrate contain approximately the same number of bacteria as would be present in one quart of milk which had been fully fermented by the same bacteria. Because of the variability of bacteria strains, the particular conditions under which they are fermented and other variables, it is impossible to give precise bacteria counts but, in general, each ml. of the concentrates will contain $10\text{–}60\times10^9$ cells per ml. The two or three types of concentrated bacteria are then mixed with each other in the proper proportions depending on usage and with glycerol and with a nutrient medium and then the mixture is frozen to produce the stabilized, concentrated, bacterial product of the invention.

The three types of bacteria are grown in culture media in accordance with conventional practice. The particular procedures used for growing the three types of bacteria can be widely varied and form no part of the present invention. However, the bacteria must be grown separately in separate culture media and care must be taken to insure that the bacteria are phage-free. Suitable procedures are known to the dairy industry for maintaining phage-free conditions in bacterial cultures. In general, such procedures involve careful selection of the initial culture, the provision of a suitable culture rotation system and the maintenance of proper standards of cleanliness and sterilization in the equipment and in the area in which the culturing operation is carried out.

A preferred procedure for culturing the acid-producing bacteria and, also, Streptococcus diacetylactis, so as to prevent bacteriophage development without hindering culture activity, is described in the "Journal of Dairy Science," October 1961, volume XLIV, No. 10, pages 1799–1810 and U.S. Pat. No. 3,041,248. Specifically, a culture medium is made by dissolving five pounds of powdered skim milk, ten pounds of lactose and two and one-half pounds of Basamin Busch yeast in sixty gallons of water which has been preheated to 130 degrees Fahrenheit. 3.4 pounds of $Na_2HPO_4$, $H_2O$ and 5.1 pounds of $KH_2PO_4$ are dissolved in distilled water and are added to and mixed in the culture medium. The medium is heated to 200 degrees Fahrenheit and held at that temperature for one-half hour. 1.5 pounds of $K_4P_2O_7$ are dissolved in distilled water and this solution is added to the culture medium held at 200 degrees Fahrenheit. The solution is cooled to 72 degrees Fahrenheit and then it is inoculated with a mother culture of the acid-producing bacteria or Streptococcus diacetylactis after which it is incubated for from 18 to 20 hours at from 72 degrees Fahrenheit to 77 degrees Fahrenheit.

It may be necessary to neutralize the culture medium for the acid-producing bacteria during the culturing step by adding suitable neutralizing agents at selected times. Ordinarily, the neutralizing agent is added when the pH of the medium drops to 5.2 and sufficient neutralizing agent is added to raise the pH to about 6.6. NaOH, $Na_2CO_3$ or other neutralizing agents can be used for this purpose. The foregoing described procedure has been found to be highly satisfactory for culturing the acid-producing bacteria while avoiding the development of phage so that the product of this culturing step is especially satisfactory for the purposes of this invention.

The preferred procedure for culturing the flavor-producing bacteria is the same as that used for the acid-producing bacteria except that the culture medium may be different and, for example, may be trypsin digest milk, cottage cheese whey or corn steep plus dextrose (which is preferred) because these latter media favor the growth of the flavor-producing bacteria more than does a medium consisting essentially of plain milk. With the flavor-producing bacteria, it usually is not necessary to neutralize the culture medium except when corn steep is used as the culture medium. In all other respects, the procedure for culturing the flavor-producing bacteria can be the same as that previously described with respect to the acid-producing bacteria and Streptococcus diacetylactis and, hence, needs no further description.

After the three types of bacteria have been separately grown as above described, each is separated from the medium in which it has been grown and is concentrated by passing the medium containing the bacteria through a suitable centrifugal apparatus so that the liquid is discharged from the apparatus and the bacteria collect on the bowl of the apparatus from whence they may be scraped out or mechanically ejected during the operation of the centrifuge. The three types of bacteria are separately centrifuged so that separate concentrates of the three types of bacteria are obtained. Apparatus capable of centrifuging culture mediums to separate and recover bacteria from them is commercially available and hence does not need detailed description.

The three types of bacteria are then mixed with other materials which serve to maintain the viability of the bacteria. It is particularly preferred to mix an effective amount of glycerol with the concentrated bacteria as this has been found to markedly improve their viability. For example, 100 ounces of concentrate scraped from the centrifuge bowl were mixed with 140 ounces of fresh culture medium and then 60 ounces of glycerol were added to the mixture so that glycerol amounted to about 20 percent by weight of the total concentrate. However, as little as about 2 percent by weight of glycerol can be used as a minimum while 25 percent or more by weight of glycerol can be used, if desired. The higher percentages of glycerol are not needed to maintain the viability of the bacteria, but they can effect other advantages which make the use of such amounts desirable in some instances. For example, use of about 20 percent or more by weight of glycerol provides a concentrate which is especially well suited for making yoghurt. Such a concentrate remains liquid below 32 degrees Fahrenheit and may, therefore, be more convenient for home use.

After mixing the glycerol and nutrient medium, the two or three individual bacteria concentrates are then mixed together in suitable proportions to form a mixed bacterial product which is concentrated and phage-free. The amounts of the two or three individual bacteria concentrates which are mixed together will depend upon the particular fermented product to be formed by the mixed bacterial product. Where the mixed bacterial product is to be used for making buttermilk, about 1–4 percent of the total bacteria of the mixed concentrate should be Streptococcus diacetylactis, about 8 percent should be flavor-producing bacteria and the balance should be acid-producing bacteria. Where cottage cheese or hard cheeses are to be made, about 98 percent of the total bacteria in the mixed bacterial concentrate should be acid-producing bacteria and about 2 percent should be flavor-producing bacteria. One or the other of the flavor-producing bacteria and Streptococcus diacetylactis can be eliminated from the bacterial concentrate for producing cottage cheese, depending on taste requirements.

Where the mixed bacterial concentrate is to be stored for any appreciable period of time, i.e., more than a week or so, it should be frozen after it is formed and, preferably be held at about −4 degrees Fahrenheit because in such condition the viability of the bacteria will be maintained for a long time.

A suitable amount of the concentrated and mixed bacterial product can be mixed with milk, either fresh, whole milk, skim milk or reconstituted dry milk, so that the milk can be fermented thereby in order to form a fermented milk product. The concentrated, mixed bacterial product can be placed directly into the milk to be processed without any intermediate propagations. In other words, the concentrated, mixed bacterial product of the invention serves in place of the bulk starter conventionally used for this purpose. In all other respects, the method of fermenting the milk to form the end product can be in accordance with conventional procedures. The high bacteria concentration in the mixed bacterial concentrate of the invention make it possible, however, to prepare fermented milk products in a much shorter period of time than is required according to conventional procedures, simply by using larger amounts of the concentrate. Specifically, by adding relatively large amounts of the concentrate to milk, it is possible to reduce the time of setting the milk to an hour or so. In this fashion, it is possible for a consumer to make certain types of cultured milk products, such as yoghurt, in the home. Also, a dairy can use this technique to produce small quantities of cultured milk products rapidly.

Furthermore, this invention eliminates the troublesome problem, especially for small operators, of anticipating the demand for certain cultured milk products, which is presently necessary, several days in advance when he must start the propagating sequence. That is, he can keep a supply of phage-free, concentrated mixed bacterial product on hand for use on relatively short notice in precise quantities, so that the desired end product can be produced rapidly, usually on the same day that the need for same becomes apparent.

Example I.—Preparation of cottage cheese 100 gallons of milk were pasteurized by heating to 200 degrees Fahrenheit for about a half-hour or longer. The milk was cooled to 70 degrees Fahrenheit and then 60 ccs. of the mixed bacterial concentrate containing about 98 perent by weight of acid-producing bacteria and about 2 percent by weight of flavor-producing bacteria, was added to it and thoroughly mixed. The mixture was incubated at 78 degrees Fahrenheit for about 14 hours and there was obtained a cottage cheese product of pleasing flavor and proper consistency.

Example II.—Preparation of cultured buttermilk 100 gallons of milk were pasteurized by heating to 200 degrees Fahrenheit and holding for about a half hour. The milk was cooled to 74 degrees Fahrenheit and was inoculated with one ounce of the bacterial concentrate containing about 90 percent by weight of acid-producing bacteria and about 8 percent by weight of flavor-producing bacteria and 2 percent of Streptococcus diacetylactis. The mixture was incubated for approximately 14 hours at 74 degrees Fahrenheit until its titratable acidity expressed as lactic acid reached about 0.85 to 1.0 percent. The mixture was then cooled and agitated to a smooth consistency to produce a cultured buttermilk product.

Example III.—Home preparation of yoghurt 14 ounces of evaporated milk, one pint of water, 2 ounces of instant powdered milk and one cubic centimeter of the mixed bacterial concentrate containing 20 percent by weight of glycerol were mixed together and then allowed to stand at 74 degrees Fahrenheit for 24 hours until thickened. The yoghurt product has a pleasing flavor and the typical consistency of yoghurt preparations. By using larger amounts of the concentrate or faster growing bacteria, such as L. bulgaricus or by incubating at a higher temperature the time for incubation can be reduced to as little as one hour or so.

Although particular, preferred embodiments of the invention have been disclosed herein for illustrative purposes, it will be understood that variations or modifications of such disclosure, which lie within the scope of the appended claims are fully contemplated.

What is claimed is:

1. The method of producing a mixed bacterial concentrate *useful for culturing milk which comprises:*

(*a*) separately incubating in separate culture media two types of bacteria, the first type being selected from the group consisting of Streptococcus lactis, Streptococcus cremoris, Lactobacillus bulgaricus and Streptococcus thermophilus *which produce lactic acid wherein the incubation culture medium contains skim milk and wherein during the incubation the lactic acid produced is neutralized as the pH of the medium drops by adding a neutralizing agent to maintain the growth of the bacteria,* and the second type being selected from the group consisting of streptococcus citrovorus and Streptococcus paracitrovorus, *wherein the culture medium contains skim milk or a digest milk to produce bacteria which are centrifugable from the media to form a concentrate;*

(*b*) concentrating the respective media to obtain separate concentrates of the two bacteria[,] *containing at least about 10x10⁹ cells/ml. each;*

(*c*) mixing together the two types of bacteria in the desired proportions to produce a mixed concentrate having closely controlled amounts of the two types of bacteria therein without permitting further growth of the bacteria; and (*d*) then freezing the mixed concentrate so that it can be stored for a long time without major loss in the viability of the bacteria.

2. The method of claim 1, including the steps of mixing glycerol and a nutrient medium in the concentrates in precise relative proportions.

3. The method of claim 1, including the step of neutralizing the culture medium for said first type of bacteria to maintain the pH thereof between about 5.2 and about 6.6

[4. A stabilized, mixed bacteria concentrate consisting essentially of a substantially neutralized mixture of two types of bacteria, the first type being selected from the group consisting of *Streptococcus lactis, Streptococcus cremoris, Lactobacillus bulgaricus* and *Streptococcus thermophilus,* and the second type being selected from the group consisting of *Streptococcus citrovorus* and *Streptococcus paracitrovorus,* said concentrate being stabilized by the admixture of a stabilizing agent and a nutrient medium so that the concentrate is stabilized against rapid loss of viability, said concentrate being frozen so that it can be stored for a long period of time without major loss in the viability of the bacteria.]

[5. A stabilized mixed bacteria concentrate according to Claim 4, in which the concentrate contains at least about $10\times10^9$ cells per ml.]

[6. A stabilized mixed bacteria concentrate according to Claim 4, in which the stabilizing agent is glycerol.]

[7. A stabilized mixed bacteria concentrate according to Claim 4, in which the bacteria of said first type comprise of at least about 88% of the total count in the bacteria concentrate.]

[8. The method of producing a mixed bacterial concentrate which comprises separately incubating in separate culture media three types of bacteria, the first type being selected from the group consisting of *Streptococcus lactis, Streptococcus cremoris, Lactobacillus bulgaricus* and *Streptococcus thermophilus,* the second type being selected from the group consisting of *Streptococcus citrovorus* and *Streputococcus paracitrovous,* and the third type consisting of *Streptococcus diacetylactis,* concentrating the respective media to obtain separate concentrates of the three bacteria, mixing together the three types of bacteria in the desired proportions to produce a mixed concentrate having closely controlled amounts of the three types of bacteria therein without permitting further growth of the bacteria, and then freezing the mixed concentrate so it can be stored for a long time without major loss in the viability of the bacteria.]

[9. The method of Claim 8, including the steps of mixing glycerol and a nutrient medium in the concentrates in precise relative proportions.]

[10. A stabilized, mixed bacteria concentrate consisting essentially of a substantially neutralized mixture of three types of bacteria, the first type being selected from the group consisting of *Streptococcus lactis, Streptococcus cremoris, Lactobacillus bulgaricus* and *Streptococcus thermophilus,* the second type being selected from the group consisting of *Streptococcus citrovorus* and *Streptococcus paracitrovorus* and the third type consisting of *Streptococcus diacetylactis,* said concentrate being stabilized by the admixture of a stabilizing agent and a nutrient medium so that the concentrate is stabilized against rapid loss of viability, said concentrate being frozen so that it can be stored for a long period of time without major loss in the viability of the bacteria.]

[11. A stabilized mixed bacteria concentrate according to Claim 10, in which the concentrate contains at least about $10\times10^9$ cells per ml.]

[12. A stabilized mixed bacteria concentrate according to Claim 10, in which the stabilizing agent is glycerol.]

[13. A stabilized mixed bacteria concentrate according to Claim 10, in which the bacteria of the second type comprise about 8% of the total count of the bacteria concentrate, the bacteria of the third type comprise between about 1% and 4% of the total count of the bacteria concentrate, the balance being bacteria of the first type.]

[14. A stabilized bacteria concentrate consisting essentially of a substantially neutralized concentrate of a bacteria selected from the group consisting of *Streptococcus citrovorus* and *Streptococcus paracitrovous,* said concentrate being stabilized by the admixture of a stabilizing agent and a nutrient medium so that the concentrate is stabilized against rapid loss of viability, the concentrate being frozen so it can be stored for a long time without major loss in the viability of the bacteria, the concentrate containing at least about $10\times10^9$ cells per ml.]

[15. A stabilized, mixed bacteria concentrate consisting essentially of a substantially neutralized mixture of three types of bacteria, the first type consisting of *Streptococcus lactis,* and the second type being selected from the group consisting of *Streptococcus citrovorus* and *Streptococcus paracitrovorus,* said concentrate being stabilized by the admixture of a stabilizing agent and a nutrient medium so that the concentrate is stabilized against rapid loss of viability, said concentrate being frozen so that it can be stored for a long period of time without major loss in the viability of the bacteria.]

[16. A stabilized, mixed bacteria concentrate consisting essentially of a substantially neutralized mixture of three types of bacteria, the first type consisting of *Streptococcus lactis,* the second type being selected from the group consisting of *Streptococcus citrovorus* and *Streptococcus paracitrovorus,* and the third type consisting of *Streptococcus diacetylactis,* said concentrate being stabilized by the admixture of a stabilizing agent and a nutrient medium so that the concentrate is stabilized against rapid loss of viability, said concentrate being frozen so that it can be stored for a long period of time without major loss in the viability of the bacteria.]

*17. The method of producing a mixed bacterial concentrate which comprises:*

(*a*) *separately incubating in separate culture media three types of bacteria, the first type being selected from the group consisting of Streptococcus lactis, Streptococcus cremoris, Lactobacillus bulgaricus and Streptococcus thermophilus, which produce lactic acid wherein the incubation culture medium contains skim milk and wherein during incubation the lactic acid produced is neutralized as the pH of the medium drops by adding a neutralizing agent to maintain the growth of the bacteria, the second type being selected from the group consisting of Streptococcus citrovorus and Streptococcus paracitrovorus wherein the culture media contains skim milk or a digest milk, and the third type consisting of Streptococcus diacetylactis which is incubated and neutralized in the manner of the first type of bacteria to produce bacteria which are centrifugable from the media to form a concentrate;*

(*b*) *concentrating the respective media to obtain separate concentrates of the three bacteria containing at least about $10\times10^9$ cells/ml. each;*

(*c*) *mixing together the three types of bacteria in the desired proportions to produce a mixed concentrate having closely controlled amounts of the three types*

*of bacteria therein without permitting further growth of the bacteria; and*

*(d) then freezing the mixed concentrate so it can be stored for a long time without major loss in the viability of the bacteria.*

*18. The method of Claim 17, including the steps of mixing glycerol and a nutrient medium in the concentrates in precise relative proportions.*

References Cited

The following references, cited by the Examiner, are of record in the patented file of this patent or the original patent.

UNITED STATES PATENTS

| | | | |
|---|---|---|---|
| 3,041,248 | 6/1962 | Hargrove | 195—96 |
| 1,957,555 | 5/1934 | Reichel et al. | 195—59 |
| 2,121,442 | 6/1938 | Nordsiek | 99—59 |

OTHER REFERENCES

Lamprech (thesis), 62–4703, Production and Storage of Dairy Starter Organisms, Univ. of Wisconsin, May 1962.

Longworth et al., Journal of Bacteriology, vol. 29, No. 6, pp. 595–607 (1935).

Hargrove, Journal of Dairy Science, 1961, vol. 44, pp. 1799 to 1810.

Lamprech et al., Journal of Applied Bacteriology, vol. 26, No. 3, December 1963, pp. 359–369.

Journal of Dairy Science, Vol. 45, pp. 1263 to 1266 and 1290 to 1294, October 1962.

LIONEL M. SHAPIRO, Primary Examiner

U.S. Cl. X.R.

195—111; 426—61, 36, 43